United States Patent
Hurlebaus

[11] 3,726,130
[45] Apr. 10, 1973

[54] METHOD OF MONITORING A WELDING OPERATION

[75] Inventor: Richard P. Hurlebaus, Huntingdon Valley, Pa.

[73] Assignee: The Budd Company, Philadelphia, Pa.

[22] Filed: Dec. 9, 1970

[21] Appl. No.: 96,374

[52] U.S. Cl. ............................. 73/67.8 R, 219/109
[51] Int. Cl. ........................................... G01n 29/00
[58] Field of Search ....................... 219/109, 110; 73/67.8

[56] References Cited

UNITED STATES PATENTS

| 2,433,963 | 1/1948 | Tarbox et al. | 219/109 |
| 2,280,226 | 4/1942 | Firestone | 73/67.8 |
| 3,149,221 | 9/1964 | Watter et al. | 219/110 |
| 2,439,130 | 4/1948 | Firestone | 73/67.8 |
| 3,237,251 | 3/1966 | Thalmann | 73/67.5 R |

OTHER PUBLICATIONS

Goldman, Ultrasonic Technology, p. 16–18

Primary Examiner—Richard C. Queisser
Assistant Examiner—Arthur E. Korkosz
Attorney—Thomas I. Davenport, Edward M. Farrell, John D. Sowell, Alford L. Trueax, Jr. and William R. Nolte

[57] ABSTRACT

A method of monitoring a spot welding operation of two overlapping pieces includes transmitting and receiving ultrasonic shear wave pulse signals into and from the two pieces while the welding operation is being performed. Means are then provided to indicate the degree of penetration of the weld into the pieces.

6 Claims, 5 Drawing Figures

PATENTED APR 10 1973  3,726,130

INVENTOR.
RICHARD P. HURLEBAUS
BY
Edward M. Farrell
ATTORNEY

METHOD OF MONITORING A WELDING OPERATION

Ultrasonic signals have been used extensively in testing. They have also been used in connection with the testing involving welding operations. One such testing system involves a U.S. Pat. No. 2,433,963 issued to Tarbox et al. entitled "Weld Testing Apparatus." In this patent ultrasonic signals are applied across a pair of pieces which have been welded. The characteristic of the weld is determined by its effect upon the output signal which is applied to a receiver.

Numerous flaw detection systems have been employed using ultrasonic signals. In these systems, ultrasonic waves have been transmitted into a piece of material under test. Output signals are developed from the reflections generated by the flaw. These output signals have been used to detect the nature of the flaw.

While ultrasonic signals have been used extensively in testing systems, they have generally been used to detect conditions after the operation has been performed. In some cases, however, the heating of the weld joint has been used to monitor a welding operation.

It is desirable to check the quality of a welding operation while the weld is being performed. For example, when two overlapping metal pieces are to be welded together, the welding electrode may be placed over the top piece to melt the metal. A weld nugget formed in the first piece proceeds through the first piece into the second piece. The second piece is also melted. The degree of penetration into the second piece determines the quality of the weld to a great extent. It is desirable to measure this degree of penetration during the welding operation in order to assure that a satisfactory weld has been made as well as possibly applying a feed-back arrangement to control the degree of penetration.

It is an object of this invention to provide an improved method of monitoring a welding operation.

It is a further object of this invention to provide an improved method of monitoring a welding operation to determine the degree of penetration of a weld.

It is still a further object of this invention to provide an improved method of monitoring an arc spot welding operation wherein the depth of weld may be compared with data from a standard weld to determine acceptable welds.

In accordance with the present invention, a method of monitoring a welding operation for spot welding two overlapping pieces is provided. Ultrasonic shear wave pulse signals are transmitted into the two pieces while the welding operation is being performed. Means are provided to indicate the degree of penetration of the weld into the two pieces.

Other objects and advantages of the present invention will be apparent and suggest themselves to those skilled in the art, from a reading of the following specification and claims, in conjunction with the accompanying drawing, in which:

The ultrasonic inspection or monitoring system of the present invention involves using ultrasonic shear waves introduced normal to the surface of the sheet to be welded to a second sheet. The introduction of shear waves is necessary in order to discriminate between the wrought metal and the melted portion of the weld nugget. The basic concept involved in the subject invention is that shear waves may be transmitted through wrought metal but are attenuated by the liquid metal. Longitudinal or compressional stress waves do not have the same effect as shear waves and are not generally useful in the system such as to be described in connection with the present invention.

An article entitled "Launching Ultrasonic Shear Waves into Solids at Normal Incidence by Pressure Coupling" by D.I. Crecraft, printed in the Journal of Sound Vibrations (1964) I (4), 381-387, describes ultrasonic shear waves propagation. The article also describes a type of transducer of the type which may be used in connection with the present invention. Such transducers must generally be applied to the surface being tested under relatively high pressures.

Figure 1:
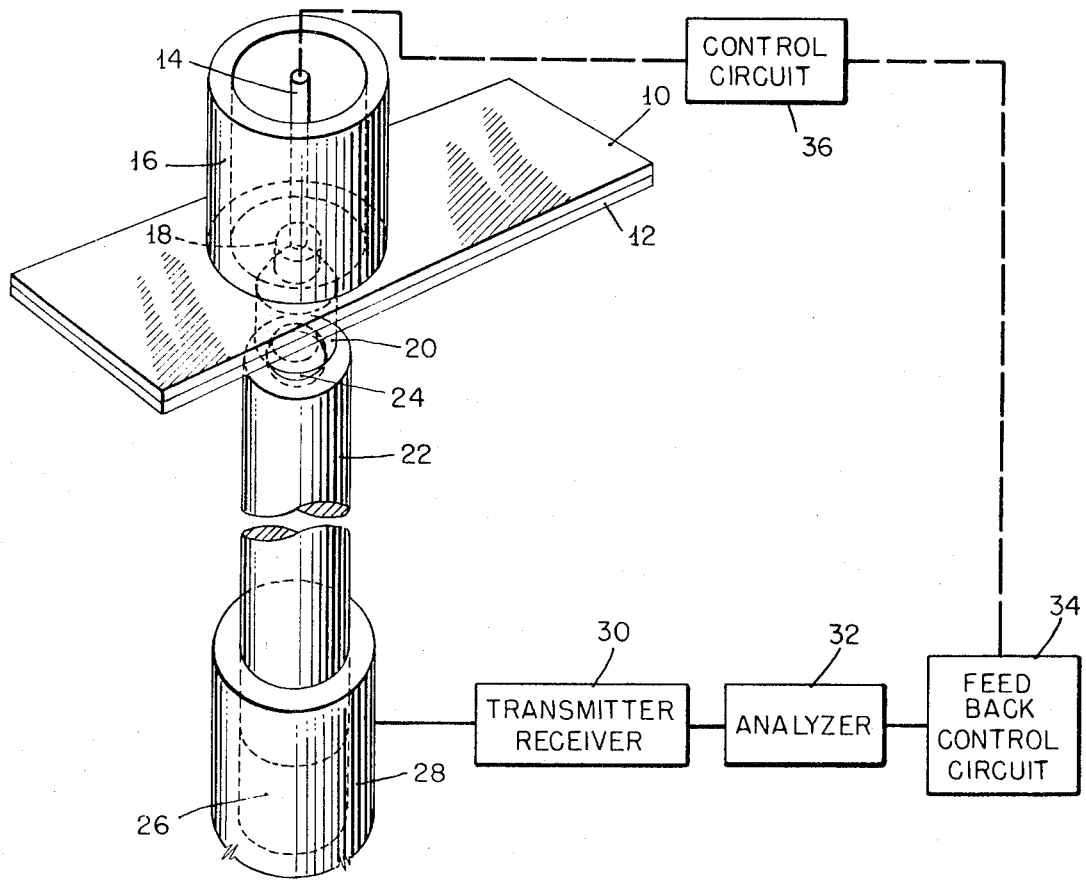
FIG. 1 is a view illustrating a welding operation, in accordance with the present invention.

Referring particularly to FIG. 1, a pair of overlapping metallic pieces 10 and 12 are positioned to be welded together, for example by a spot welding operation. An electrode 14, which may be of the consumable or non-consumable type, is surrounded by a shield 16. An inert gas may be applied within the shield to surround the arc during a welding operation. The electrode 14 is disposed over the top surface of the piece 10 in an arc welding system but could contact the top surface in a resistance weld operation. The shield 16 makes it possible to apply a relatively high pressure against the top surface of the piece 10. This high pressure is desirable in order to counteract the force which must be exerted by the bottom transducer to permit shear waves.

When power is applied to the electrode 14, a welding operation is performed on the pieces 10 and 12 in a conventional manner. The metal of the top piece 10 is gradually melted and the weld penetrates into the lower piece 14. The present invention is related toward detecting the degree of penetration of the weld into the bottom piece 12. The area of the weld is defined as the dotted line 18. The area of the weld is dependent upon the thicknesses of pieces to be welded. For example, if the pieces are approximately 0.028 inch thick, the diameter of the weld area should be about 0.120 inch; if 0.040 inch thick, the weld area should be about 0.180 inch diameter, and if the pieces are about 0.062 inch thick, the diameter of the weld area should be about 0.250 inch.

The ultrasonic transducer is contained within a housing 20 which is adapted to engage the bottom surface of the piece 12 under relatively high pressure. The pressure against the transducer may be applied from a piston rod 22 engaging a steel ball 24. This is basically the type of transducer described in the aforementioned article by Crecraft. The piston rod may be driven by a source of oil reservoir 26 included in the hydraulic cylinder 28. The size of the transducer, which may be a piezoelectric crystal of the flat disc type, well known to those skilled in the art, should be comparable to the area of the weld being monitored. If it is too large, reflections from the top surface and interface of the pieces would always be reflected. If it is too small, a proper degree of penetration might be indicated for welds of insufficient area.

Ultrasonic signals are applied to the transducer assembly 20 from a transmitter-receiver unit 30. These signals may be in the form of conventional ultrasonic pulse signals. The pulse signals are transmitted into the bottom piece 12. In the absence of a weld, pulse signals will be reflected at the inner face of the pieces 10 and 12 as well as the top surface of the piece 10. These reflected pulses will be received by the transmitter-receiver unit 30 and may be analyzed by the analyzer 32, which for example could be an oscilloscope.

When a welding operation is being performed, the metal of the top piece 10 melts with the melting proceeding to the piece 12. A signal will be reflected from the area between the melting metal and the solid metal.

The signals generated by the transducer assembly 20 are shear waves and are relatively narrow in the order of the diameter of the weld area being monitored. Shear waves are characterized by particle oscillation in a plane normal to the direction of propagation, and can therefore only propagate by the transmission of shear wave from one particle to the next. Because no gases and only one or two extremely viscous liquids have any shear stiffness, shear waves can in general only be propagated in solids. Consequently, when the shear waves are transmitted into the pieces 10 and 12, the signals transmitted will be attenuated by melting metal. This characteristic may be taken advantage of to detect the degree of penetration of a weld during an actual welding operation.

In some cases, the data received by the transmitter and receiving unit 30 may be first analyzed by the analyzer 32 and compared with a standard signal. The standard signal or data may represent an acceptable weld. After a comparison with the standard data, an output signal may be generated and applied to a feed-back control circuit 34. The output signal from the feed-back control circuit 34 may be applied to the control circuit 36, which in turn controls the amount of power which is applied to the electrode 14. The control circuit 36 may be utilized to discontinue the application of the power to the electrode 14 when the proper degree of penetration is indicated.

Figure 2:
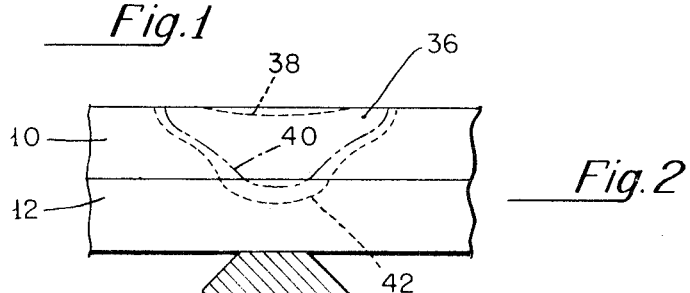
FIG. 2 illustrates two pieces which have been welded together in accordance with FIG. 1 with the nature of the weld penetration during different stages of the welding operation being illustrated.

Referring particularly to FIG. 2, the two pieces 10 and 12 are illustrated as having a weld 36 therein. The weld proceeds from the top surface of the piece 10 and penetrates into the piece 10 through the interface between the pieces 10 and 12 and finally into the piece 12. These degrees of penetration are illustrated by dotted lines 38, 40 and 42. The transducer 21 disposed on an element 19 of the transducer housing is pressed against the bottom surface of the piece 12 and will transmit signals into the pieces with the transmitted pulse signals being reflected back to the transmitter-receiver unit 30. A pulse signal will be reflected from the area of penetration of the welds, as, for example from the areas represented by the dotted lines 38, 40 and 42. It is noted that the shear waves are directed only to the area of the weld to be monitored.

Figure 3A:
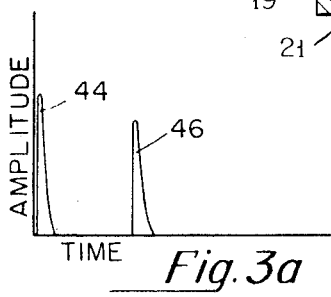
FIGS. 3a, 3b and 3c illustrate various wave forms of the types which are displayed on an oscilloscope screen shown for the purposes of explaining the present invention.
Figure 3B:
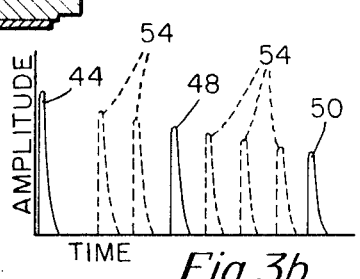
Figure 3C:
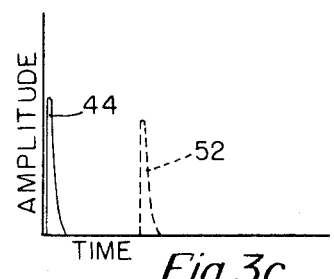

Referring particularly to FIGS. 3a, 3b and 3c, FIG. 3a represents generally signals which would normally appear on an oscilloscope which could be part of the analyzer 32. Pulse signals 44 represent the transmitted signals. In FIG. 3a, the pulse signal 46 may represent the standard or reference pulse representing a degree of penetration of a weld which would be considered acceptable.

Referring to FIG. 3b, the pulse 48 may represent the reflected pulse from the interface of the two pieces 10 and 12. The pulse 50 represents the reflected pulse from the top surface of the piece 10.

In FIG. 3c, the pulse 52 represents the reflected pulse resulting from the final weld formed within the pieces 10 and 12. It is this pulse 52 which is compared with the pulse 46 in FIG. 3a to determine whether an acceptable weld has been performed.

During a welding operation, because of the shear wave generated into the piece 10 and 12, the molten metal will attenuate the transmitted signals. However, pulses will be reflected back from the area of penetration as the welding operation proceeds. During a welding operation with the weld penetrating into the pieces, a single one of the pulses 54 will be generated. As the penetration proceeds, the pulse 54 will gradually be reflected in shorter time intervals as indicated by the pulses moving closer to the transmitted pulse 44. Because of the attenuation of the melting metal, the reflected transmitted pulses from the top surface of the piece 10 and the interface of the pieces 10 and 12, as represented by the pulse 48 and 50, will be greatly attenuated. For purposes of clarity, these pulses are not shown in FIG. 3a.

When the pulse 54 has moved to a certain predetermined time or distance from the pulse 42, an acceptable or unacceptable weld operation will be indicated.

The present invention has provided a monitoring system wherein a welding operation may be monitored during the actual welding. This is achieved by the penetration of shear waves into the pieces being welded with the transmitted wave from the transducer being comparable to the size of the weld area.

While it requires additional design, it is conceivable that the transducer and receiver of the ultrasonic system may be disposed on the top of the piece 10 along with the welding gun. However, if shear waves are to be developed, the distance between the transducers and the welding gun would be critical. Such an arrangement, however, would not require the application of the high pressures necessary in connection with the arrangement of FIG. 1.

What is claimed is:

1. A method of monitoring a welding operation wherein first and second overlapping metal pieces are welded together comprising the steps of placing a welding electrode adjacent the top exposed surface of said first metal piece to melt metal completely therethrough and partly into said second metal piece, placing a transducer in physical contact with the bottom exposed surface of said second piece, transmitting ultrasonic shear wave pulse signals from said transducer into said two pieces while said welding operation is being performed to produce reflected pulse signals from the lower boundary area of the melting metal of said second piece, receiving said reflected pulse signals to actuate said transducer, comparing said reflected signals with a standard signal to provide an instantaneous measurement of depth of a weld nugget at each point of the welding operation to indicate the degree of penetration of a weld into said second metal piece, and displaying said reflected signals to said transducer.

2. A method as set forth in claim 1 wherein said welding electrode and said transducer are placed substantially perpendicular to the exposed surfaces of said pieces and in alignment with respect to each other.

3. A method as set forth in claim 2 wherein the step of performing a spot welding operation comprises the step of producing a weld area in said second piece comparable in size to the size of said transducer.

4. A method as set forth in claim 3 wherein the additional step is provided of analyzing a received pulse signal reflected from the weld formed in said two pieces.

5. A method as set forth in claim 4 wherein the additional step is provided of comparing a received pulse signal reflected from the weld with a standard signal.

6. A method as set forth in claim 5 wherein the additional step is provided of feeding back a control signal to control said welding operation as the weld is being developed.

* * * * *